US012699918B2

(12) United States Patent
Jaskie et al.

(10) Patent No.: US 12,699,918 B2
(45) Date of Patent: Aug. 4, 2026

(54) SYSTEMS AND METHODS FOR PHOTOVOLTAIC FAULT DETECTION USING A FEEDBACK-ENHANCED POSITIVE UNLABELED LEARNING

(71) Applicants: Kristen Jaskie, Scottsdale, AZ (US); Joshua Martin, Geneva, IL (US); Andreas Spanias, Tempe, AZ (US)

(72) Inventors: Kristen Jaskie, Scottsdale, AZ (US); Joshua Martin, Geneva, IL (US); Andreas Spanias, Tempe, AZ (US)

(73) Assignee: Arizona Board of Regents on Behalf Arizona State University, Tempe, AZ (US)

( * ) Notice: Subject to any disclaimer, the term of this patent is extended or adjusted under 35 U.S.C. 154(b) by 1192 days.

(21) Appl. No.: 17/517,447

(22) Filed: Nov. 2, 2021

(65) Prior Publication Data

US 2022/0138631 A1 May 5, 2022

Related U.S. Application Data

(60) Provisional application No. 63/109,189, filed on Nov. 3, 2020.

(51) Int. Cl.
*G06N 20/00* (2019.01)

(52) U.S. Cl.
CPC .................................... *G06N 20/00* (2019.01)

(58) Field of Classification Search
CPC ......... G06N 20/00; G06N 20/10; H02S 50/10
See application file for complete search history.

(56) References Cited

U.S. PATENT DOCUMENTS

| | | | | |
|---|---|---|---|---|
| 10,790,779 | B2 * | 9/2020 | Balog, Jr. .......... | G05B 13/0265 |
| 2020/0209841 | A1 * | 7/2020 | Srinivasan .......... | G05B 23/024 |
| 2020/0210854 | A1 * | 7/2020 | Srinivasan .............. | G06N 5/02 |

OTHER PUBLICATIONS

Zhou, Haining, Volkan Seker, and Thomas Downar. "Enhanced Lasso Regularization-Based Self-Adaptive Feature Selection Algorithm for the High-Dimensional Uncertainty Quantification of TREAT Transient Test Modeling." Nuclear Technology 206.6 (2020): 839-861. (Year: 2020).*
Das, Shubhomoy, et al. "End-user feature labeling: Supervised and semi-supervised approaches based on locally-weighted logistic regression." Artificial Intelligence 204 (2013): 56-74. (Year: 2013).*
Shanableh, Tamer, and Khaled Assaleh. "Feature modeling using polynomial classifiers and stepwise regression." Neurocomputing 73.10-12 (2010): 1752-1759. (Year: 2010).*

(Continued)

*Primary Examiner* — Jennifer N Welch
*Assistant Examiner* — Megan Elizabeth Hwang
(74) *Attorney, Agent, or Firm* — Polsinelli PC

(57) ABSTRACT

Various embodiments of a system and associated method for identifying and classifying faults in a photovoltaic array using relatively little labeled data are described herein. In particular, the system builds on existing PU classification techniques by addition of a feedback loop that enables classification of limited operational data of a photovoltaic array by expanding a plurality of features within the operational data based on a learned importance of each feature.

21 Claims, 8 Drawing Sheets

102

(56)                    References Cited

OTHER PUBLICATIONS

Jaskie, Kristen, and Andreas Spanias. "Positive and unlabeled learning algorithms and applications: A survey." 2019 10th International Conference on Information, Intelligence, Systems and Applications (IISA). IEEE, 2019. (Year: 2019).*

Hastie, Trevor, Robert Tibshirani, and Jerome Friedman. "The elements of statistical learning. pp. 57-77, 139-141" (2009). (Year: 2009).*

Huang, Ling, et al. "Predicting execution time of computer programs using sparse polynomial regression." Advances in neural information processing systems 23 (2010). (Year: 2010).*

Aggarwal, C. (2015). Data Classification. In: Data Mining. Springer, Cham. https://doi.org/10.1007/978-3-319-14142-8_10 (Year: 2015).*

H. Braun et al., Signal processing for solar array monitoring, fault detection, and optimization, vol. 4. 2012.

S. Rao et al., Machine Learning for Solar Array Monitoring, Optimization, and Control. Synthesis Lectures on Power Electronics, Morgan & Claypool, 2020.

U.S. Appl. No. 62/808,677, 2019, Narayanaswamy et al., Systems And Methods For Connection Topology Optimization In Photovoltaic Arrays Using Neural Networks.

U.S. Appl. No. 62/843,821, 2018, Rao et al., Solar Array Fault Detection, Classification and Localization Using Deep Neural Nets.

U.S. Appl. No. 63/023,620, 2020, Fan et al., Systems and Methods for Fault Classification in Photo-voltaic Arrays using Graph Signal Processing.

U.S. Appl. No. 63/039,012, Muniraju et al., M20-254P Dropout and Pruned Neural Networks for Fault Classification in Photovoltaic Arrays.

A. Dobos, "PVWatts version 1 technical reference," in National Renewable Energy Lab, No. Octoberz, Golden, CO, 2013.

A. Wisler, V. Berisha, A. Spanias, and A. O. Hero, "Direct estimation of density functionals using a polynomial basis," IEEE Trans. Signal Process., vol. 66, No. 3, pp. 558-572, Feb. 2018.

B. Z. Zhang and W. L. Zuo, "Co-EM support vector machine based text classification from positive and unlabeled examples," in ICINIS, Wuhan, China, IEEE, pp. 745-748, Nov. 2008.

C. Elkan and K. Noto, "Learning classifiers from only positive and unlabeled data," in SIGKDD, Las Vegas, ACM, pp. 213-220, Aug. 2008.

D. Ienco and R. G. Pensa, "Positive and unlabeled learning in categorical data," Neurocomputing, vol. 196, pp. 113-124, Jul. 2016ja.

D. Riley and J. Johnson, "Photovoltaic prognostics and heath management using learning algorithms," Conf. Rec. IEEE Photovolt. Spec. Conf., pp. 1535-1539, 2012.

D. Zhang and W. S. Lee, "A Simple Probabilistic Approach to Learning from Positive and Unlabeled Examples," in UKCI, Springer, pp. 83-87, Sep. 2005.

E. Pedersen et al., "PV Array Fault Detection using Radial Basis Networks," in IEEE IISA, Patras, Greece, Jul. 2019.

E. Sansone, F. G. B. De Natale, and Z. H. Zhou, "Efficient Training for Positive Unlabeled Learning," TPAMI, Jul. 2018.

F. De Comité, F. Denis, R. Gilleron, et all, "Positive and unlabeled examples help learning," Algorithic Learn. Theory, v. 1720, pp. 219-230, Dec. 1999.

F. Denis, R. Gilleron, and F. Letouzey, "Learning from positive and unlabeled examples," Theor. Comput. Sci., vol. 348, No. 1, pp. 70-83, Dec. 2005.

F. Denis, R. Gilleron, and M. Tommasi, "Text classification from positive and unlabeled examples," in IPMU, Annecy, France, Jul. 2002.

F. Mordelet and J. P. Vert, "A bagging SVM to learn from positive and unlabeled examples," Pattern Recognit. Lett., vol. 36, pp. 201-209, 2014.

G. Niu, M. C. du Plessis, T. Sakai, Y. Ma, and M. Sugiyama, "Theoretical Comparisons of Positive-Unlabeled Learning against Positive-Negative Learning," in NIPS, Barcelona, Spain, ACM, pp. 1207-1215, Dec. 2016.

G. Ward, T. Hastie, S. Barry, J. Elith, et all, "Presence-only data and the em algorithm," Biometrics, vol. 65, No. 2, pp. 554-563, May 2009.

H. Gan, Y. Zhang, and Q. Song, "Bayesian belief network for positive unlabeled learning with uncertainty," Pattern Recognit. Lett., Apr. 2017.

H. Song, J. J. Thiagarajan, p. Sattigeri, and A. Spanias, "Optimizing kernel machines using deep learning," IEEE Trans. Neural Networks Learn. Syst., vol. 29, No. 11, pp. 5528-5540, Feb. 2018.

J. Bekker and J. Davis, "Beyond the Selected Completely At Random Assumption for Learning from Positive and Unlabeled Data," ArXiv, 2018.

J. Bekker and J. Davis, "Learning From Positive and Unlabeled Data: A Survey," ArXiv, Nov. 2018.

J. Fan, S. Rao, G. Muniraju, C. Tepedelenlioglu, and A. Spanias, "Fault Classification in Photovoltaic Arrays via Graph Signal Processing," in ICPS, Tampere, Finland, Jun. 2020.

J. Zhang, Z. Wang, J. Meng, Y. P. Tan, and J. Yuan, "Boosting positive and unlabeled learning for anomaly detection with multi-features," IEEE Trans. Multimed., vol. 21, No. 5, pp. 1332-1344, May 2019.

J. Zhang, Z. Wang, J. Yuan, and Y.-P. Tan, "Positive and Unlabeled Learning for Anomaly Detection with Multi-features," in ACM MM, Mountain View, ACM, pp. 854-862, Oct. 2017.

K. Jaskie and A. S. Spanias, "Positive and Unlabeled Learning Algorithms and Applications : a Survey," in IEEE IISA, Patras, Greece, pp. 1-8, Jul. 2019.

K. Jaskie, C. Elkan, and A. Spanias, "A Modified Logistic Regression for Positive and Unlabeled Learning," in IEEE Asilomar, Pacific Grove, California, pp. 0-5, Nov. 2019.

L. Bonsignore, M. Davarifar, A. Rabhi, G. M. Tina, and A. Elhajjaji, "Neuro-Fuzzy fault detection method for photovoltaic systems," Energy Procedia, vol. 62, pp. 431-441, 2014.

L. de Carvalho Pagliosa and R. F. de Mello, "Semi-supervised time series classification on positive and unlabeled problems using cross-recurrence quantification analysis," Pattern Recognit., vol. 80, pp. 53-63, Aug. 2018.

L. L. Jiang and D. L. Maskell, "Automatic fault detection and diagnosis for photovoltaic systems using combined artificial neural network and analytical based methods," Proc. Int. Jt. Conf. Neural Networks, vol. 2015—Septe, No. Mar. 2015.

L. S. Bruckman et al., "Statistical and domain analytics applied to PV module lifetime and degradation science," IEEE Access, vol. 1, pp. 384-403, 2013.

M. C. du Plessis, G. Niu, and M. Sugiyama, "Analysis of Learning from Positive and Unlabeled Data," NIPS, pp. 703-711, Dec. 2014.

M. C. Du Plessis, G. Niu, and M. Sugiyama, "Class-prior estimation for learning from positive and unlabeled data," in Asian Conf. Mach. Learn., Hong Kong, China, pp. 221-236, Nov. 2015.

M. C. du Plessis, G. Niu, and M. Sugiyama, "Convex Formulation for Learning from Positive and Unlabeled Data," in Proceedings of the 32nd International Conference on Machine Learning, Lille, France, 2015.

M. Claesen, F. De Smet, J. A. K. Suykens, and B. De Moor, "A robust ensemble approach to learn from positive and unlabeled data using SVM base models," Neurocomputing, vol. 160, pp. 73-84, Jul. 2015.

M. H. Ali, A. Rabhi, A. El Hajjaji, and G. M. Tina, "Real Time Fault Detection in Photovoltaic Systems," Energy Procedia, vol. 111, No. Sep. 2016, pp. 914-923, 2017.

M. Hou, B. Chaib-Draa, C. Li, and Q. Zhao, "Generative Adversarial Positive-Unlabelled Learning," in IJCAI, Stockholm, Sweden, Jul. 2018.

M. Kato, T. Teshima, and J. Honda, "Learning from Positive and Unlabeled Data with a Selection Bias," ICLR, May 2019.

R. Kiryo, G. Niu, M. C. du Plessis, and M. Sugiyama, "Positive-Unlabeled Learning with Non-Negative Risk Estimator," in NIPS, Long Beach, Curran Assoc. Inc., pp. 1674-1684, Dec. 2017.

S. Daliento et al., "Monitoring, diagnosis, and power forecasting for photovoltaic fields: A review," Int. J. Photoenergy, vol. 2017, 2017.

S. Katoch et al., "Shading prediction, fault detection, and consensus estimation for solar array control," Proc.—2018 IEEE Ind. Cyber-Physical Syst. ICPS 2018, pp. 217-222, 2018.

(56) References Cited

OTHER PUBLICATIONS

U. S. Shanthamallu, A. Spanias, C. Tepedelenlioglu, and M. Stanley, "A brief survey of machine learning methods and their sensor and IoT applications," in IEEE IISA, Larnaca, Cyprus, Aug. 2017.

U. S. Shanthamallu, J. J. Thiagarajan, H. Song, and A. Spanias, "GrAMME: Semi-Supervised Learning using Multi-layered Graph Attention Models," IEEE Trans. Neural Networks Learn. Syst., pp. 1-12, Nov. 2019.

V. S. Narayanaswamy, R. Ayyanar, A. Spanias, C. Tepedelenlioglu, and D. Srinivasan, "Connection Topology Optimization in Photovoltaic Arrays using Neural Networks," in ICPS, Taipei, Taiwan, pp. 167¬172, May 2019.

Y. Zhao, B. Lehman, R. Ball, J. Mosesian, and J. F. De Palma, "Outlier detection rules for fault detection in solar photovoltaic arrays," Conf. Proc.—IEEE Appl. Power Electron. Conf. Expo.—APEC, No. March, pp. 2913-2920, 2013.

Y. Zhao, F. Balboni, T. Arnaud, J. Mosesian, R. Ball, and B. Lehman, "Fault experiments in a commercial-scale PV laboratory and fault detection using local outlier factor," 2014 IEEE 40th Photovolt. Spec. Conf. PVSC 2014, No. Dec. 2015, pp. 3398-3403, 2014.

* cited by examiner

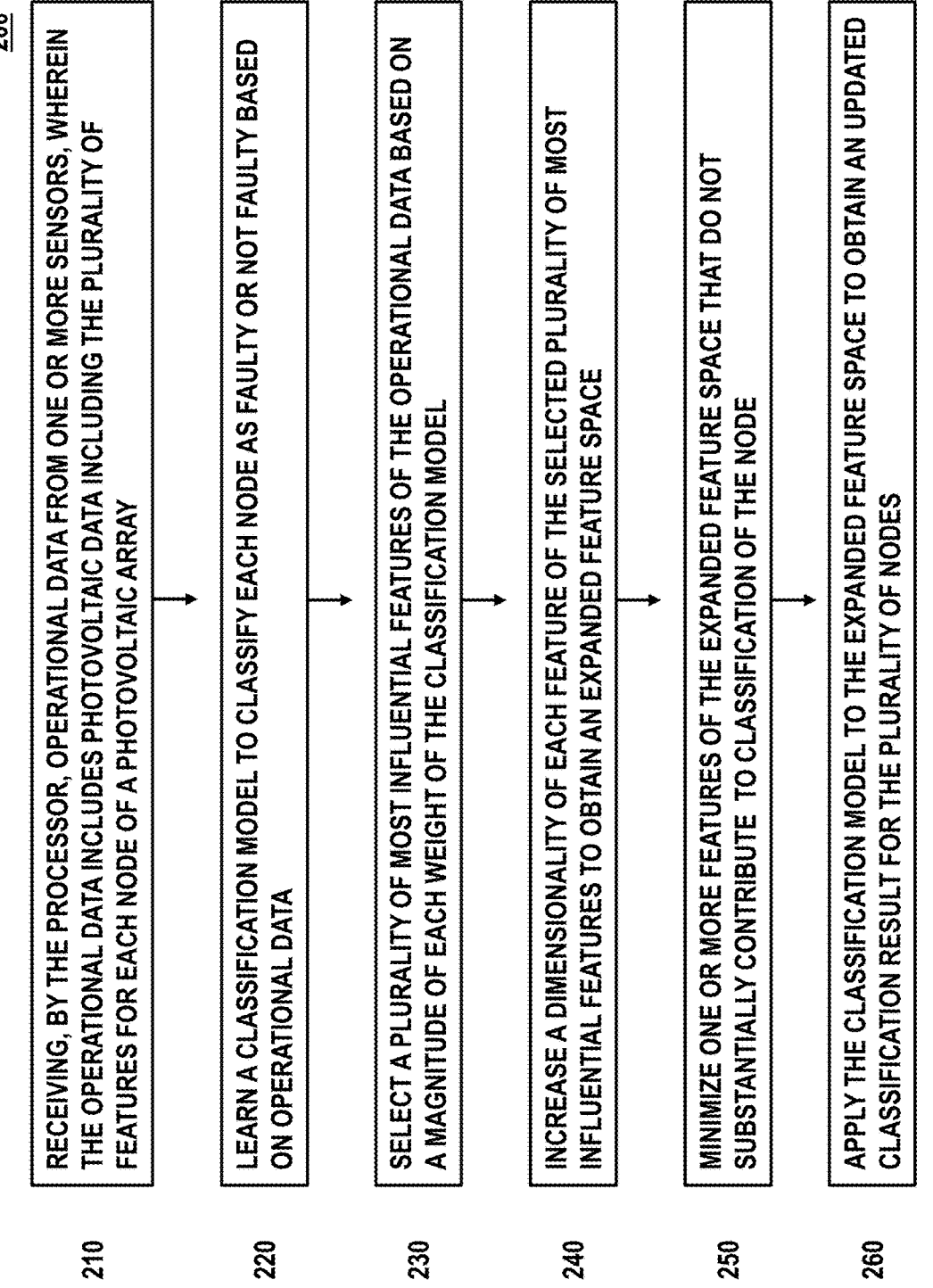

200

210 RECEIVING, BY THE PROCESSOR, OPERATIONAL DATA FROM ONE OR MORE SENSORS, WHEREIN THE OPERATIONAL DATA INCLUDES PHOTOVOLTAIC DATA INCLUDING THE PLURALITY OF FEATURES FOR EACH NODE OF A PHOTOVOLTAIC ARRAY

220 LEARN A CLASSIFICATION MODEL TO CLASSIFY EACH NODE AS FAULTY OR NOT FAULTY BASED ON OPERATIONAL DATA

230 SELECT A PLURALITY OF MOST INFLUENTIAL FEATURES OF THE OPERATIONAL DATA BASED ON A MAGNITUDE OF EACH WEIGHT OF THE CLASSIFICATION MODEL

240 INCREASE A DIMENSIONALITY OF EACH FEATURE OF THE SELECTED PLURALITY OF MOST INFLUENTIAL FEATURES TO OBTAIN AN EXPANDED FEATURE SPACE

250 MINIMIZE ONE OR MORE FEATURES OF THE EXPANDED FEATURE SPACE THAT DO NOT SUBSTANTIALLY CONTRIBUTE TO CLASSIFICATION OF THE NODE

260 APPLY THE CLASSIFICATION MODEL TO THE EXPANDED FEATURE SPACE TO OBTAIN AN UPDATED CLASSIFICATION RESULT FOR THE PLURALITY OF NODES

FIG. 4

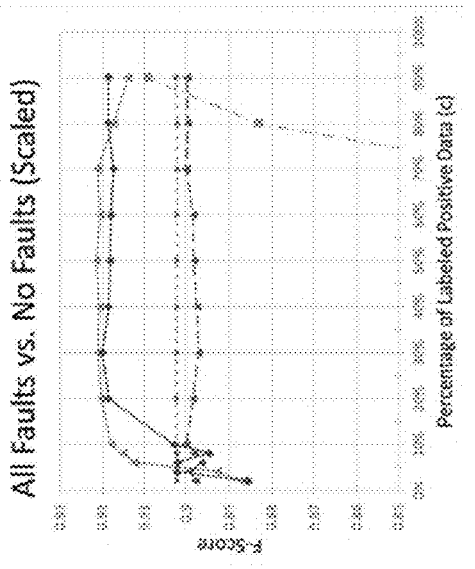
FIG. 5B
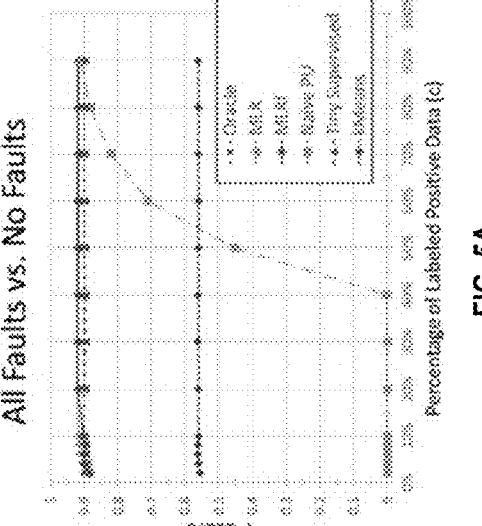
FIG. 5A
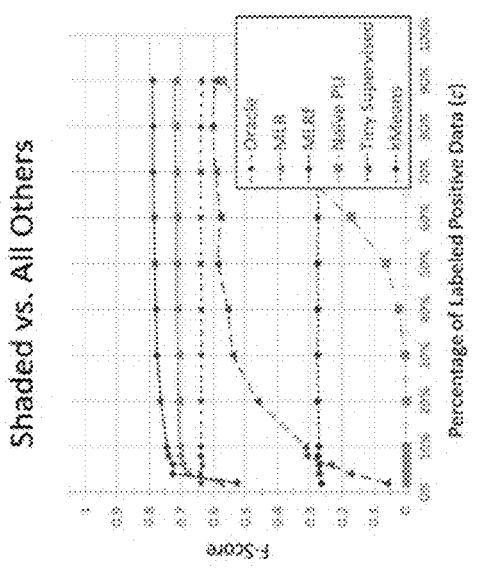
FIG. 5D
FIG. 5C

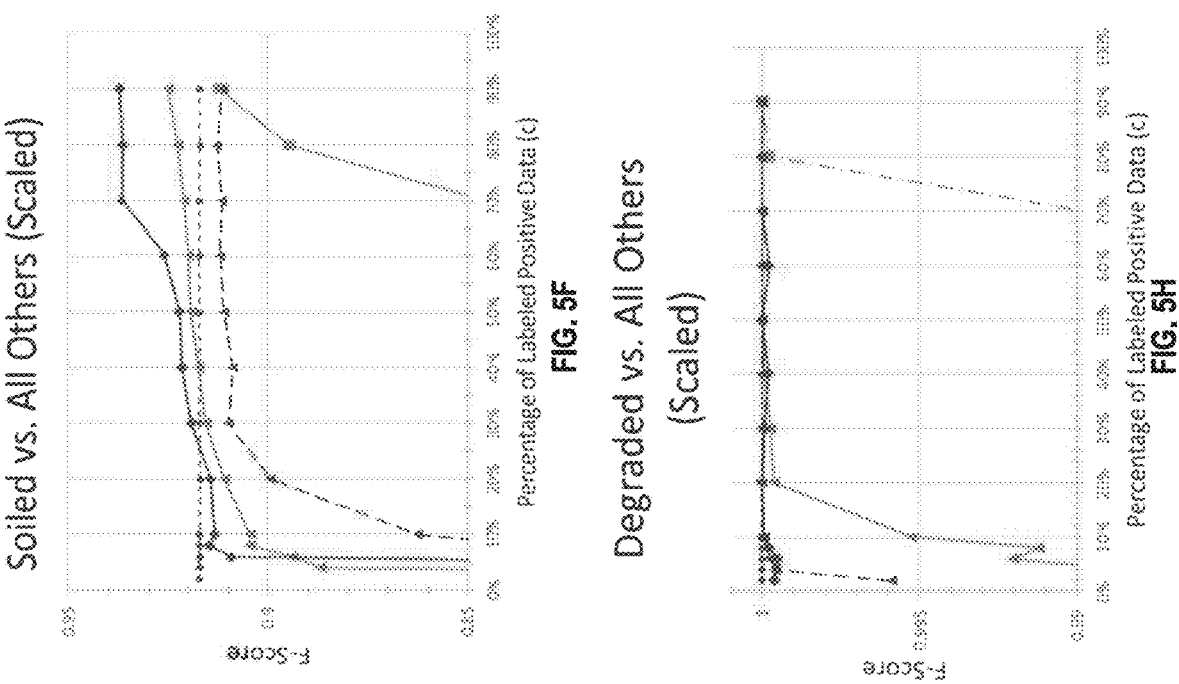
FIG. 5F
FIG. 5H
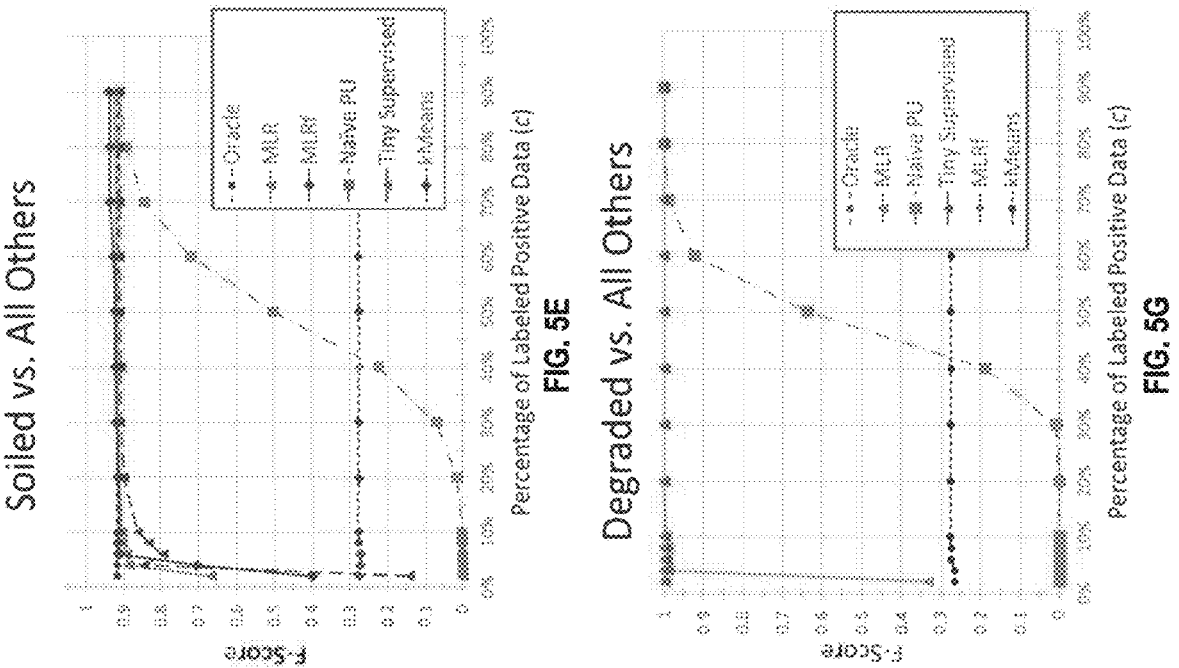
FIG. 5E
FIG. 5G

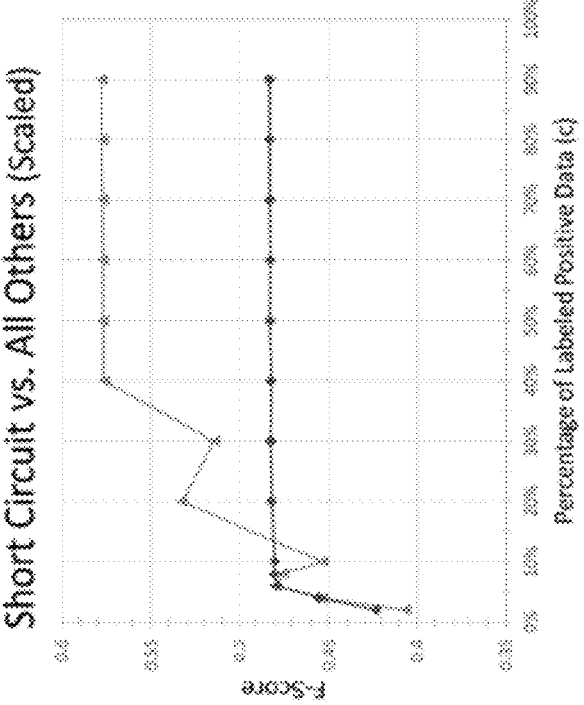
FIG. 5J
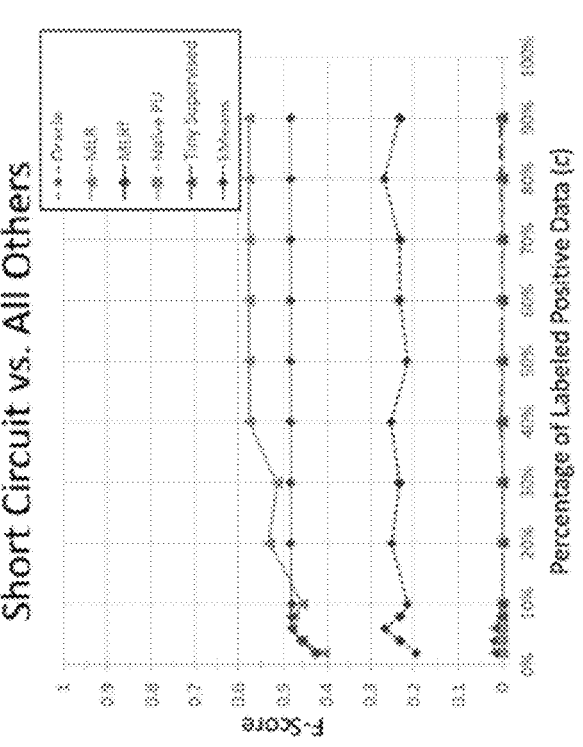
FIG. 5I

SYSTEMS AND METHODS FOR PHOTOVOLTAIC FAULT DETECTION USING A FEEDBACK-ENHANCED POSITIVE UNLABELED LEARNING

CROSS-REFERENCE TO RELATED APPLICATIONS

This non-provisional application that claims benefit to U.S. Provisional Patent Application Ser. No. 63/109,189 filed 3 Nov. 2020, which is herein incorporated by reference in its entirety.

GOVERNMENT SUPPORT

This invention was made with government support under grants 1854273 and 1646542 awarded by the National Science Foundation. The government has certain rights in the invention.

FIELD

The present disclosure generally relates to photovoltaic systems, and in particular, to a system and associated method for fault detection in photovoltaic systems using a custom positive unlabeled learning methodology.

BACKGROUND

Despite substantial improvements in solar array efficiency in recent years, accurate fault detection and diagnosis remains an open problem as undetected faults can cause substantial power loss and hazardous conditions. Solar panel arrays can experience several types of faults of varying severity. Some faults, such as those associated with soiled or dirty solar panels and shaded solar panels simply reduce the efficiency of the PV array. These can be corrected by identifying and then cleaning the array or removing objects causing shading when possible. Another type of fault is caused by degradation of panels after extended usage, especially under extreme weather conditions. Solar panels can also experience short-circuit and ground leakage faults which can damage the panels and can also be hazardous by causing fires and/or posing risks to maintenance staff. Various machine learning (ML) and signal processing techniques have been developed for solar fault detection and identification in utility scale PV arrays. However, these algorithms generally need large amounts of labeled training data that is difficult and expensive to obtain. Additionally, these algorithms are typically not fault-specific and generally do not distinguish among different types of faults. There is a need for an effective solution that can detect and accurately classify PV faults with a small amount of labeled data.

It is with these observations in mind, among others, that various aspects of the present disclosure were conceived and developed.

BRIEF DESCRIPTION OF THE DRAWINGS

FIG. 4 is a flowchart showing a methodology for fault detection within the PV array for execution by the system of FIG. 1;

FIGS. 5A-5J illustrate F-score results for the system of FIG. 1 in comparison with a plurality of fault classification methodologies.

Corresponding reference characters indicate corresponding elements among the view of the drawings. The headings used in the figures do not limit the scope of the claims.

DETAILED DESCRIPTION

Figure 1:
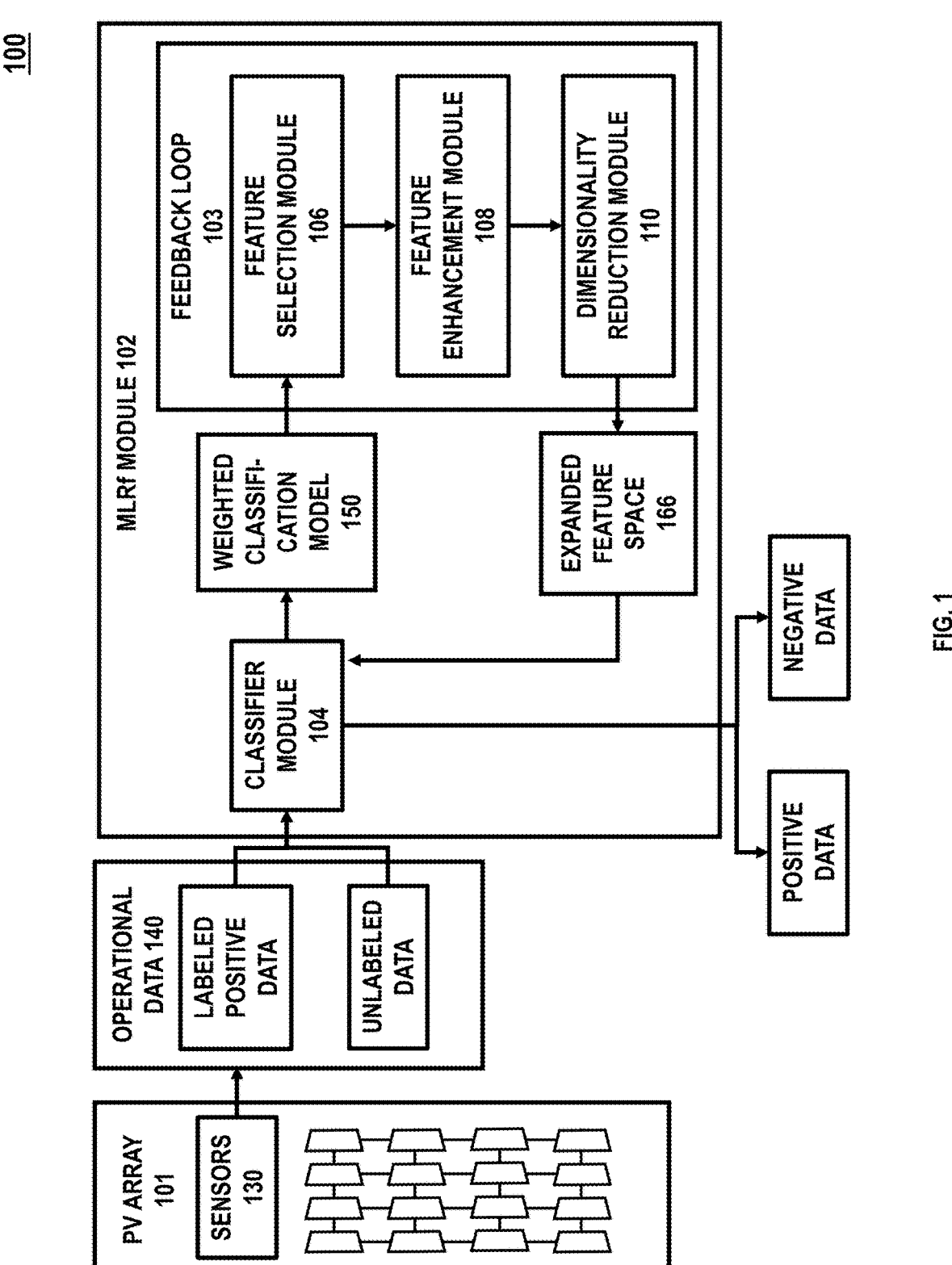
FIG. 1 is a simplified block diagram showing a system for fault detection within a PV array.

Various embodiments of a system and associated method for detecting and classifying faults in a photovoltaic (PV) array are disclosed herein. The system includes a PV array configured to provide a set of features related to the operation of the PV array, such as current and voltage values. The system further includes a computing device in communication with the PV array, the computing device storing instructions in a memory for execution of a method for identifying and classifying faults in the PV array based on the set of features provided by the PV array. The method utilizes a modified logistic regression (MLR) method in communication with a feedback loop for identifying, enhancing and reducing the most effective features to modify the MLR method and provide an effective learning mechanism for identifying and classifying PV faults with limited labeled data. Referring to the drawings, embodiments of the system and associated method for detecting and classifying PV faults are illustrated and generally indicated as 100 and 200 in FIGS. 1-5.

INTRODUCTION

A unique and powerful type of semi-supervised learning called Positive and Unlabeled learning (PU learning) effectively classifies data when only unlabeled data and a small amount of labeled training data from the class of interest is available. For PV fault detection, it is possible to obtain a small number of fault examples of one or more types. A large amount of unlabeled PV data of unknown fault status can be automatically generated during day-to-day solar generation. With a small amount of labeled data and large quantity of unlabeled data, this problem is well defined as a PU learning problem. This is much less expensive than identifying the large training set required for traditional supervised learning algorithms.

Several machine learning (ML) methods have been studied for solar fault detection, with most modern algorithms using some type of deep neural network solution provide a thorough survey of current algorithms in the field and results are promising, however training the current state of the art deep learning algorithms is quite data intensive and requires large, labeled data sets. Collecting and labeling these large datasets is expensive and the data may be unique and sometimes must be at least partially re-collected for each PV solar array and location. In this disclosure, a new fault detection methodology that requires significantly less labeled training samples using positive and unlabeled learning (PU learning)—a family of newer semi-supervised positive unlabeled learning algorithms. General semi-supervised learning algorithms use some labeled data but improve their models with additional unlabeled data. In recent years, some semi-supervised algorithms have been applied to PV fault detection for the very reasons listed above. However, general semi-supervised learning algorithms require some labeled data from both the positive (in this case the solar fault) class and the negative (clean, non-faulty) class. PU learning is a binary semi-supervised classification process in which only a small quantity of labeled data from only one class (the positive class) is available, along with a quantity of inexpensive and unlabeled data. This is useful as while PV faults may be noticeable, care must be taken not to miss a fault before declaring a datapoint as fault-free.

In this disclosure, a system 100 for customized PU learning is tailored specifically for solar fault detection and similar small feature-set classification problems. The feature space available for solar fault data is generally small—limited to a dozen or less sensor features and typically historical data. The system 100 includes a Feedback-enhanced Modified Logistic Regression ("MLRf") module 102 that integrates a customized feedback loop 103 with a classifier module 104; in particular, the classifier module 104 uses Modified Logistic Regression (MLR) which uses PU learning to obtain a classification of data for each node (panel or groups of panels) into a first class or a second class from a photovoltaic (PV) array 101. In some embodiments, the first class is indicative of a detected fault in the PV array 101, and the second class is indicative of an absence of a detected fault in the PV array 101.

The system 100 is optimized to effectively detect solar faults in real time even when very little labeled data is available. This disclosure will demonstrate that using this system 100, similar or even better accuracy than other documented ML methods can be obtained, even those with all labels present.

The system 100 adapts an existing algorithm called Modified Logistic Regression (MLR) PU learning algorithm for use in solar fault detection and similar problems. MLR was developed in part by some inventors of this disclosure. The resulting new methodology is a Feedback-enhanced MLR (MLRf) methodology and was designed for solar fault classification and related PU learning problems where there are limited features and labeled data. MLR, MLRf of the present system 100 along with other solar fault detection algorithms are also evaluated and compared herein using the standardized NREL PVWatts solar fault dataset (described later in this disclosure) for insight into the fault classification problem and to determine the number of labeled data required for effective solar fault classification. For each evaluated, excluding an oracle (a supervised learning algorithm that knows all and sees all—typically used as a best-case comparator), the percentage of known, labeled fault data is varied between 2% and 90% of the total positive data.

Solar fault detection methodologies compared in this disclosure (and explained in more depth herein) include:

(1) The MLR algorithm.

(2) The MLRf module 102 of the system 100 described in this disclosure.

(3) A naïve PU implementation using a supervised learning algorithm and treating all unlabeled datapoints as negatives.

(4) An "oracle" supervised learning algorithm with all labels known.

(5) A "tiny" supervised learning algorithm (the term "tiny" is used, not to indicate a specific algorithm, but to indicate the process where the training is done with a small number of labels. Not to be confused with Tiny ML algorithms) using the same number of labeled data as MLR or MLRf, but in this case balanced between positive and negative samples instead of only positive.

(6) An unsupervised k-means clustering algorithm, mostly for curiosity and to illustrate the benefit of having some labels in all other cases.

It was found that the PU learning algorithms, both the existing MLR and the new MLRf module 102 of the present system 100, were able to match and even outperform even the fully supervised oracle algorithm with only 5% of the data labeled. This disclosure demonstrates that using the same number of labeled samples, the PU learning algorithms both outperform a smaller supervised learning algorithm that does not take advantage of the unlabeled samples. This, in addition to the fact that it is the nature of the problem that it is easier to label a faulty sample than to guarantee that a sample is not faulty, confirms that given a labeling budget, it is more effective to label only faulty samples than to attempt to label both faulty and non-faulty ones.

The main contributions of this disclosure include: (1) the use of a unique PU learning algorithm for solar array fault detection, (2) the adaptation of MLR to work for solar fault detection, (3) the ability to effectively use significantly fewer labeled training data than most supervised learning algorithms by applying PU learning techniques to solar fault detection problems, (4) the introduction of a new PU learning algorithm including a feedback loop, MLRf, designed to better detect and classify solar fault data, (5) the development of new comparative results demonstrating the effectiveness and robustness of the MLRf methodology at detecting solar faults with very little labeled data, and (6) the demonstration that labeling x positive samples is more effective than labeling x total positive and negative samples.

Materials and Methods

In this section the NREL PVWatts solar fault dataset that is used for experimentation as well as a more detailed description of the new or unusual methodologies from the introduction: the MLR, MLRf of the system 100, naïve PU, oracle, and "tiny" supervised learning algorithms.

But first, a quick note on notation. In addition to the standard classification notation of using $\bar{x}$ and y to represent a data sample and its label respectively, a new random variable s is introduced to represent if that sample is labeled or unlabeled. The PU problem can then be formally stated as:

$$p(s-1|y=0)=0 \qquad (1)$$

The classification goal can be thought of as the creation of a probabilistic function $f(\bar{x})$ such that:

$$f(x) = p(y=1|x) \qquad (2)$$

Feature Set from PV Array

Figure 2:
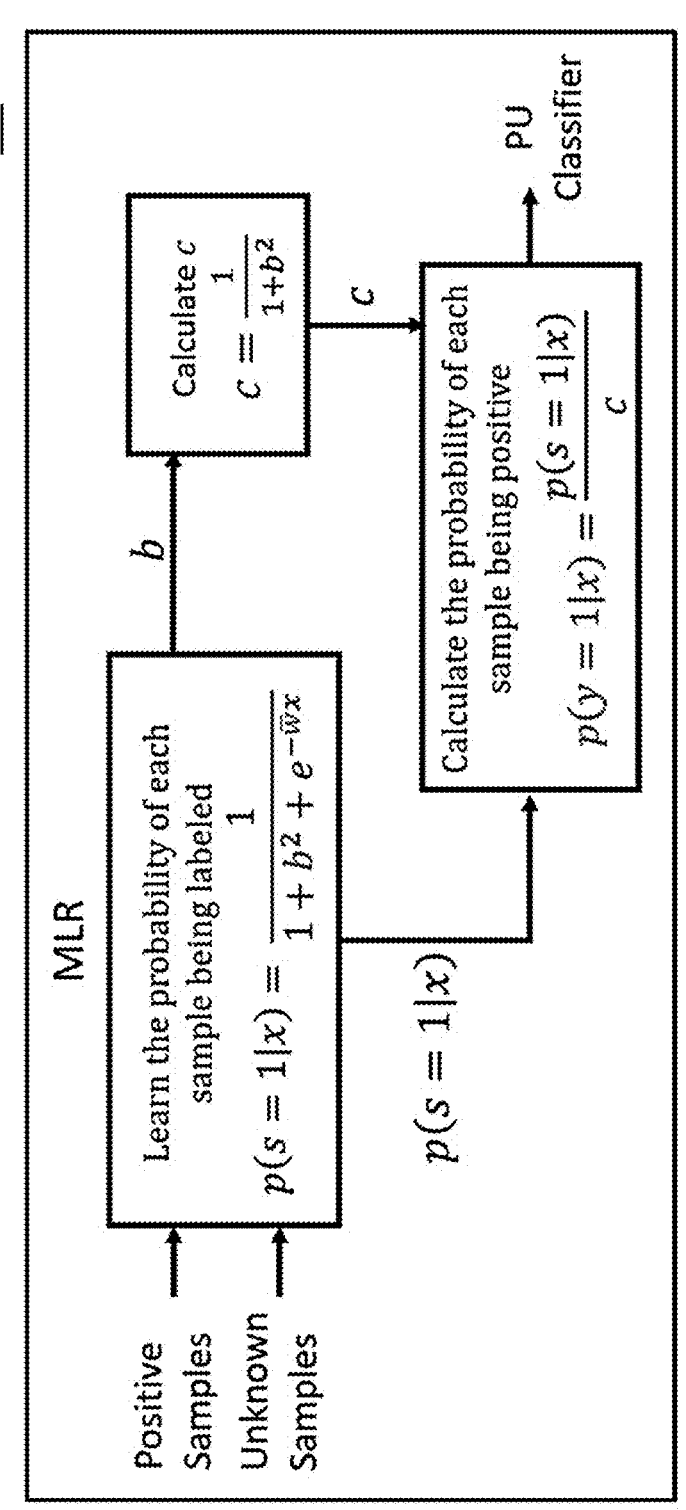
FIG. 2 is a simplified block diagram showing a Modified Logistic Regression module of the system of FIG. 1.

Referring to FIGS. 1 and 2, a plurality of features 160 are selected from operational data 140 recorded by one or more sensors 130 of a photovoltaic array 101. This plurality of features 160 can be site-specific but should include as many data points as are available. The plurality of features 160 can include, but are not limited to: maximum voltage ($V_{mp}$) and maximum current ($I_{mp}$) which lie at the knee of a current-voltage characteristic curve, a power produced by the PV array, the irradiance and temperature, the open circuit voltage ($V_{oc}$), the short circuit current ($I_{sc}$), the gamma (power over irradiance) and the fill factor (ratio of the product of the $I_{sc}$ and $V_{oc}$ over $V_{mp}$ and $I_{mp}$). In some embodiments and at some PV generation sites, not all of these features are available and other features may be available and should be included when possible. Moreover, many PV sites produce only aggregate data instead of individual panel data.

Some number of labeled fault examples including labeled positive data still need to be identified and available, though a much smaller quantity than in traditional fault detection approaches. Examples of these faults include partial or complete shading, soilage, degradation, ground fault, arc fault, and short circuits. Additional unlabeled data including the faults of interest and non-fault data (standard test conditions—STC) needs to be available as well. Class sizes do not need to be balanced. This data then needs to be split into two parts, referred to as the positive and unlabeled classes. Examples include all faults vs no faults, shading vs all others, soiling vs all others, and so on. The available labeled data belongs to the positive class and all other data is assigned to the unlabeled class.

Figure 3:
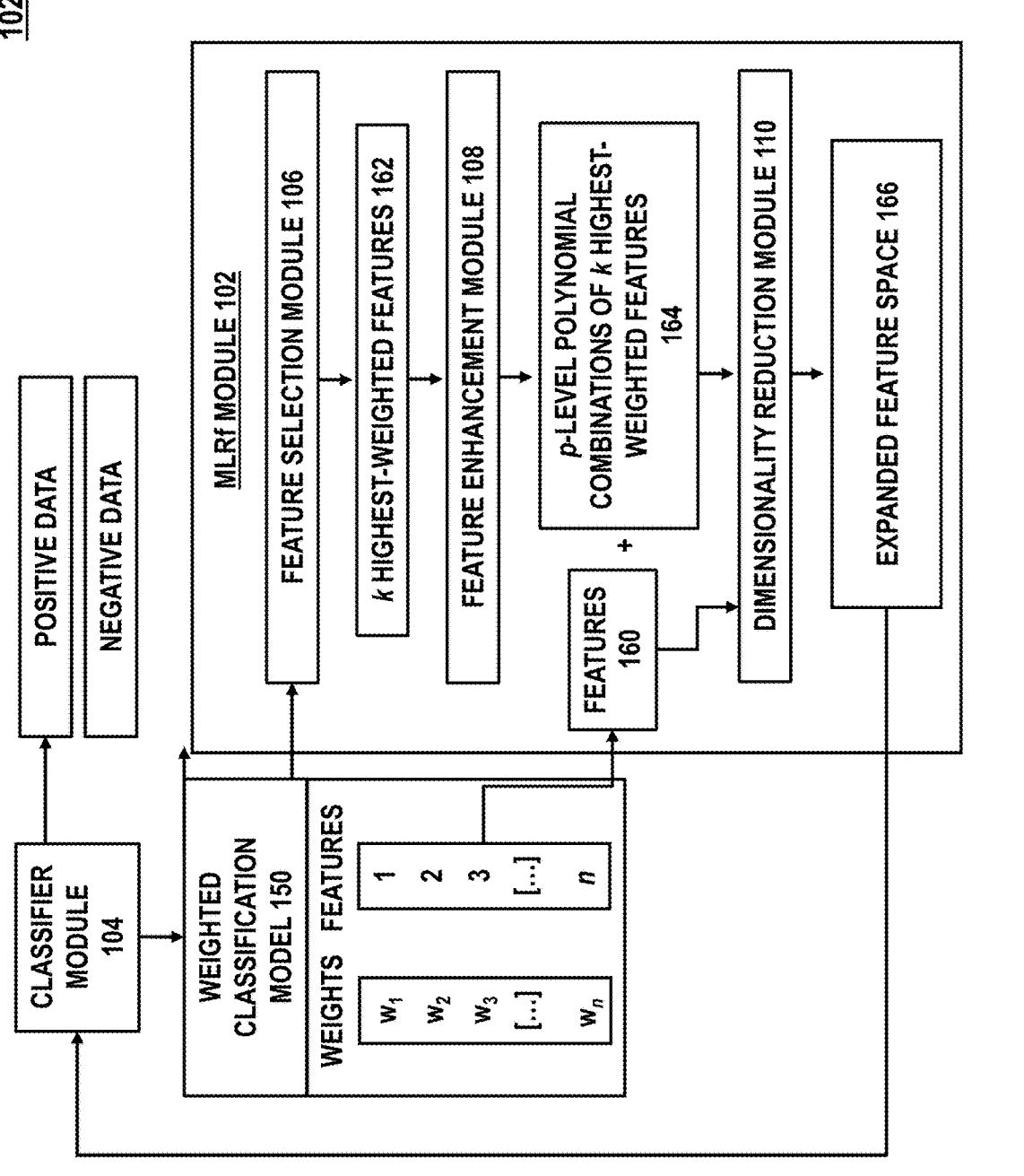
FIG. 3 is a simplified block diagram showing a feedback loop that utilizes the Modified Logistic Regression module of FIG. 2.

The feature space available for solar fault data is generally small—limited to a dozen or less sensor features and sometimes historical data. Referring to FIGS. 1-3, the present system 100 includes the feedback loop 103 that uses advanced pre-processing and feature engineering techniques is disclosed herein. The present system 100 utilizes and substantially modifies a Modified Logistic Regression (MLR) classifier module 104 by incorporating the feedback loop 103.

In some embodiments, each of a set of measurements within the operational data 140 corresponding to a node at a particular point in time (e.g. corresponding to a single panel or discrete grouping of panels) of a photovoltaic array 101 can include ten features 160—the DC output, the open circuit voltage ($V_{OC}$), short circuit current ($I_{SC}$), max power point voltage ($V_{mp}$), max current ($I_{MP}$), fill factor, temperature, irradiance, gamma ratio, and max power. Measurements can be taken for a plurality of time points over an extended period of time. A measurement was considered no fault or STC if the irradiance, temperature, and power were at the maximum values for that day. A node for a particular point in time is labeled shaded if the measured irradiance was lower than the STC by 25% or more. Soilage is labeled as present for a node for a particular point in time if the irradiance is high while the power is low, while a short circuit can be identified when the irradiance and temperature are standard but the maximum current, ($I_{MP}$), is low. A solar panel is labeled as degraded if the open circuit voltage, ($V_{OC}$), or short circuit current, ($I_{SC}$), were more than 25% below the rating of the PV module. A training dataset for training the system 100 can be included that follows these conventions. In some embodiments, the training dataset is a solar fault training dataset that is derived and modified from data generated by the PVWatts calculator at the National Renewable Energy Laboratory (NREL) for training and testing of the system 100. The dataset includes 21,485 solar measurements including equal parts (of 4297 each) clean, "no fault" or "standard conditions" data (STC), shaded, soiled, degraded, and short circuit solar data.

Positive Unlabeled Learning

A summary of the MLR methodology employed by the classification module 104 is provided here for clarity. If one makes a strong, but common assumption called the SCAR assumption and assumes that labeled positive (fault) data is selected at random from the set of all positive (fault) data, then a non-traditional classifier $g(\bar{x})=p(s=1|\bar{x})$ can be created that can be used to obtain a final PU classifier $f(\bar{x})$ (weighted classification model 150). By assuming that the labeled positive data is selected at random from all positive data, the probability of being labeled is no longer dependent on a feature vector $\bar{x}$, but only on a sample's positive status y=1 as shown in Equation (3). This results in a constant labeling frequency named c in the literature:

$$\text{SCAR assumption: } p(s = 1\bar{x}, y = 1) = p(s = 1|y = 1) = c \tag{3}$$

This final PU classifier based on a non-traditional classifier is provided as follows:

$$g(\bar{x}) = p(s = 1\,|\,\bar{x}) = p(s = 1 \wedge y = 1\,|\,\bar{x}) = \tag{4}$$

$$p(y = 1\,|\,\bar{x})p(s = 1\,|\,y = 1, \bar{x}) = p(y = 1\bar{x})p(s = 1\,|\,y = 1) = p(y = 1\,|\,\bar{x})c.$$

therefore:

$$f(\bar{x}) = p(y = 1\,|\,\bar{x}) = \frac{p(s = 1\,|\,\bar{x})}{c} \tag{5}$$

The modified logistic regression (MLR) algorithm is an effective non-traditional classifier and is defined by the expression:

$$MLR = p(s = 1\,|\,\bar{x}) = \frac{1}{1 + b^2 + e^{-\bar{\omega}\bar{x}}} \tag{6}$$

where b and ω are variables that are learned in the training process. From this MLR algorithm and its learned parameter b, one is able to estimate the lab l frequency c as the upper asymptote of Equation (6) as: algorithm and its learned parameter b, the classification module 104 is operable to estimate the label frequency c as the upper asymptote of Equation (6) as:

$$c = \frac{1}{1 + b^2} \tag{7}$$

and from this construct a final PU classifier $f(\bar{x})$ using Equation (6). After all data values have been mean normalized, a stochastic gradient ascent algorithm is used to maximize the likelihood of the MLR. The MLR algorithm details and block diagram are available in Algorithm A1 and FIG. 2.

The MLR algorithm provides an effective, general purpose PU learning algorithm, but like traditional logistic regression, the model that the sole MLR algorithm creates is mostly linear in terms of the feature values of the inputs. When the feature set is small such as can be the case for the photovoltaic array 101, additional feature engineering and enhancement is necessary.

Fault Detection and Classification

Photovoltaic fault detection and classification is different from the average classification problem as the maximum feature set is usually quite small, while vast quantities of unlabeled data can be generated automatically. As described above, the dataset used when implementing the present system 100 has thousands of measurements but only 10 features, and some of those features such as the gamma ratio are calculated as combinations of other features.

Because the feature set needed for photovoltaic fault detection and classification is so small and the problem complex, the unique feedback loop 103 is implemented to enhance the features 160 captured by the present system 100 as shown in FIG. 1. Linear classifiers may underfit the data, yet because a PU dataset has many missing labels, most non-PU non-linear classifiers such as neural networks will overfit the data to the few labeled datapoints. The classification module 104 by itself is a powerful general-purpose PU learning algorithm, analogous to standard classification algorithms such as logistic regression, support vector machines, or artificial neural networks for fully labeled data and by itself includes no feature enhancement or engineering. To better handle the small solar fault detection feature set, this disclosure introduces a modification to the MLR algorithm to become MLRf. The MLRf methodology shown in FIG. 1 and expanded upon in FIG. 3 uses MLR in the classification module 104, but also incorporates the feedback loop 103 in communication with the MLR module 104 to perform custom feature engineering—enhancing the plurality of features 160 to enable non-linear classification by the MLF module that does not overfit or underfit the data. This automates some of the preprocessing steps that are manually required by other algorithms.

A method 200 descriptive of the MLRf methodology and its application within fault detection in the photovoltaic array 101 is provided in FIG. 4. Components discussed below in the context of the method 200 are illustrated in FIGS. 1-3.

At block 210, a processor 320 receives operational data 140 from one or more sensors 130, wherein the operational data 140 includes photovoltaic data including the plurality of features 160 for each node of the photovoltaic array 101 for a particular point in time.

At block 220, the classification module 104 of the system 100 learns a weighted classification model 150 including a plurality of weights $w_1$-$w_n$ using the operational data 140. In particular, in some embodiments, the weighted classification model 150 is learned by the system 100 using the original MLR algorithm.

The weighted classification model 150 produced in block 220 described above is a weighted combination of n features 160. As the original plurality of features 160 were mean normalized as part of training, the most influential features in the model are those with the highest magnitude weights. This allows the system 100 to sort the features by importance to the model. At block 230, a feature selection module 106 of the system 100 selects the top k≤n highest weighted features 162 from the plurality of features 160 based on a magnitude of each associated weight from the weighted classification model 150 for enhancement.

At block 240, the feature enhancement module 108 of the system 100 performs additional feature enhancement by adding p-level polynomial combinations 164 of the highest weighted features 162 to the plurality of features 160 to obtain an expanded feature space 166. For example, if p=2 an enhancement of any two pairs of original features $x_1$ and $x_2$ would return an expanded feature space including $x_1$, $$x_2^1, x_2, x_2^2,$$

and $x_1 x_2$. If p=3, enhancement would include cubic values and combinations such as $x_1 \cdot x_2 \cdot x_3$, and so forth. The purpose

8 of this expansion is to increase the dimensionality of the dataset to allow for a more flexible non-linear decision boundary that is better able to accommodate the complexity of the solar fault data space. A linear decision boundary in this higher dimensional space is equivalent to a non-linear decision boundary in the original feature space.

At block 250, once the feature space has been expanded, the system 100 can additionally apply one or more regularization methods or additional feature manipulation techniques to the expanded feature space 166 at a dimensionality reduction module 110. The dimensionality reduction module 110 can include a dimensionality reduction algorithm such as PCA (Principal Component Analysis) to capture the dimensionality of the expanded feature space 166 that incorporates more than 95-99% of the variability of the space. This eliminates or minimizes any enhanced features from the expanded feature space 166 that do not substantially contribute to the final classification.

Finally, at block 260, the system 100 sends the expanded feature space 166 through the original weighted classification model 150 learned by the classifier module 104 for final classification with a now potentially non-linear classification boundary.

In addition to the standard hyperparameters such as the learning rate and number of epochs in the MLR algorithm, the MLRf introduces k, the number or percentage of important features to be enhanced, and p, the level of polynomial enhancement described in block 230 above. If PCA is used in block 250, then a number of retained components becomes an additional hyperparameter. Regularization may be preferred for this reason. Once the model has been created, it can be applied to new data in real time and to obtain an updated classification result. To capture possible changing conditions, offline training and model updates can be performed periodically.

Other Comparables:

Naïve PU Algorithm:

In practice, data with no detected faults is often labeled as negative, or not faulty. This strategy is replicated in this naïve PU algorithm which treats all unlabeled data samples as negative and performs a standard supervised classification (in this case a traditional logistic regression).

Oracle:

In computer science, an oracle is the name given to an algorithm that "knows all and sees all". In the context of this semi-supervised learning algorithm, an oracle is a fully supervised learning algorithm that has access to all the true data labels. As the two algorithms of interest, MLR and MLRf, are both fundamentally related to the traditional logistic regression algorithm, the oracle algorithm (and indeed all other comparative algorithms) use traditional, or standard logistic regression (SLR) in this disclosure to provide a better measure of comparison. In all algorithms but k-means, a simple unoptimized stochastic gradient ascent algorithm was used to fit the data. It is recognized that it is likely that other more complex supervised learning algorithms or other more advanced solvers could improve these algorithm's performance, but one objective provided in this disclosure is to assess the MLRf methodology against others in their same class. It is likely that with optimization (regularization, batch processing, more complex solvers, and so on) that eventual results will be substantially higher than they are now.

"Tiny" Supervised Learning Algorithm:

To compare the effect of having a small labeling budget more equitably, a supervised learning algorithm was developed that only trains with the same number of data points that the MLR and MLRf methodology have labeled. If MLR and MLRf have $x_L$ positive labeled and $x_{UL}$ samples available to them, this "tiny" supervised learning algorithm has $x_L$ total samples available—half positive and half negative. No unlabeled data is used. This is intended to simulate an assumed preference for supervised learning given a limited labeling budget and to compare this with the PU learning algorithm.

K-Means Algorithm:

A simple unsupervised learning algorithm is included in this comparison, more as a matter of curiosity than as a true comparison with the MLRf methodology. K-means was performed using k=5 clusters representing the five known classes in the data: shaded, soiled, degraded, short circuit, and no faults. After clustering, the individual cluster, or clusters (when performing general fault classification), were chosen to be labeled positive that contained the most samples belonging to the PU labeled positive class.

Results

Experimental Setup

To test the system 100, each fault type (shaded, soiled, degraded, and short circuit—abbreviated SC) is compared individually against all other data, including the other fault data and the non-fault STC data. All fault data was grouped together into a single "fault" class that was compared against non-fault STC data. This latter is equivalent to a general fault detection, while the former enables specific fault classification were such information known. These details are illustrated in Table 1.

TABLE 1

The binary composition of the five compared fault types.

| Name | Positive Fault Data | Size of Positive Set | Negative Non-Fault Data | Size of Negative Set |
|---|---|---|---|---|
| All Faults vs. No Faults | Shaded, Soiled, Degraded, SC | 17,188 | STC | 4297 |
| Shaded vs. All Others | Shaded | 4297 | STC, Soiled, Degraded, SC | 17,188 |
| Soiled vs. All Others | Soiled | 4297 | STC, Shaded, Degraded, SC | 17,188 |
| Degraded vs. All Others | Degraded | 4297 | STC, Shaded, Soiled, SC | 17,188 |
| Short Circuit vs. All Others | SC | 4297 | STC, Shaded, Soiled, Degraded | 17,188 |

For each of the above listed five fault types, random subsets composed of different percentages were selected between c=2% and 90% of the true positive fault data to be labeled positive out of the original. The label frequency c is unknown in a real PU dataset and constructed in simulated PU datasets such as this for algorithm evaluation. Using standard classification notation with x representing a data sample, this label frequency is defined as:

$$c = p(s = 1|y = 1). \tag{8}$$

As some applications in the PU learning field use the class prior rather than the label frequency c, a simple translation is provided:

$$\text{class prior} = p(y = 1) = \frac{p(s = 1)}{c}. \tag{9}$$

To reduce variability, each experiment listed above was run five times and the mean evaluation metrics reported for each c value in FIGS. 5A-5J. This is described in Evaluation Metrics below.

Hyperparameter Selection

The hyperparameters associated with the MLRf methodology are the learning rate, the number of epochs, the percentage of features to enhance k, the level of enhancement p, and the level of PCA feature extraction, if used. Hyperparameter tuning was performed using a grid search looking first at the learning rate and number of epochs over the MLR algorithm with no p or k. It was found that a learning rate of 0.01 and 1000 epochs generally provided the best results. A further grid hyperparameter search investigated the percentage of important features to be enhanced k=0.3, 0.6, or 1 (MLRf step 2), the values of the polynomial expansion variable p=1, 2, 3, 4 (MLRf step 3), and the PCA level of feature extraction (MLRf step 4). It was found that while the optimal k values differed for each fault type, the polynomial expansion level of p=3 combined with no PCA feature reduction gave the best results across all faults. Adding in regularization, which was not implemented in these experiments, would potentially be beneficial in the future. General fault detection and identifying solar panel soilage performed best when k=0.3; short circuit faults were best detected when k=0.6; the remaining faults were most effective when k=1.

Evaluation Metrics

In PU learning in general it is common to have heavily skewed datasets with the rare class generally labeled positive. With only a fraction of the rare positive class labeled, PU classification is a skewed classification problem with too few data to perform class balancing measures. Instead, the F-score (also called the f1-score) is typically used to evaluate each experiment as the accuracy and error rate metrics are misleading when the class sizes are not similar (if 99% of the data were negative and 1% positive, a model that predicts everything negative would have a 99% accuracy and be completely worthless). The F-score is the harmonic mean between the precision and recall (also known as sensitivity). The F-score can be thought of as analogous to accuracy in that it varies between zero and one, with better models being closer to one. The F-score is calculated as:

$$Fscore = 2 \cdot \frac{\text{Precision Recall}}{\text{Precision} + \text{Recall}} \tag{10}$$

where:

$$\text{Precision} = \frac{\#\,\text{True Positives}}{\#\,\text{True Positives} + \#\,\text{False Positives}} \tag{11}$$

and:

$$\text{Recall} = \frac{\#\,\text{True Positives}}{\#\,\text{True Positives} + \#\,\text{False Negatives}}. \tag{12}$$

For each fault type and c value, the MLRf methodology was run five times and the mean value was chosen as the F-score. This was intended to reduce variance, though it was found that the variance per run was minimal when c was greater than 10%. High variance with small c values is not unexpected as the random selection of the labeled samples becomes more impactful as the number of samples decrease.

Results and Comparisons Using F-Score Plots

In FIGS. 5A-5J below, algorithm comparison plots are presented for each of the solar fault types against all others as described in Table 1. In all graphs shown, the horizontal axis provides the label frequency c ranging from c=2% to 90%. Below 10%, c increases in increments of 2% and above 10%, c increases in increments of 10%. This means that a random selection of n true positive samples are labeled positive in the simulation, where n is defined as:

$$n = c|\text{Postive Set}|. \qquad (13)$$

In all simulations except the "all faults vs. no faults" shown in FIGS. 5A and 5B, the size of the positive set is 4297 out of 21,485 total. In FIGS. 5A and 5B, the size of the positive set is 17,188 as all four fault types are combined into the "all faults" class (as shown in Table 1). All remaining samples, both positive (faulty) and negative (non-faulty) are left unlabeled for the MLR, MLRf, and naïve PU learning algorithms. The n values for each c level are provided in Table 2.

nonlinear, this could explain the noticeable F-score improvement of the non-linear MLRf classifier. A future test should be performed against a nonlinear oracle model for confirmation.

The more surprising result in this graph is the improvement made possible by the simpler MLR algorithm. The MLR algorithm has one additional variable over the oracle (the b variable above), and it is surmised that this slight nonlinearity may be contributing to its success. It is remarkable that these high scores are possible even when only 4% of the faulty data is labeled, or 172 datapoints Soiled Vs. All Others The soilage detection models in FIGS. 5E and 5F act similarly to those in FIGS. 5A and 5B in that the MLR, MLRf, and the "tiny" supervised algorithm are similar to that of the Oracle except at low values of c. Unlike the other graphs in FIGS. 5A-5J, MLRf performance increases noticeably above the Oracle only when the label frequency c is around 70%—much higher than in other graphs. However, the actual difference is slight and may simply indicate an upward trend like that of the MLR algorithm. Due to the small number (five) of runs that were possible for this

TABLE 2

This table provides the number of labeled samples, n, out of 21,485 total, used for each c value.

| c | 2% | 4% | 6% | 8% | 10% | 20% | 30% | 40% | 50% | 60% | 70% | 80% | 90% |
|---|---|---|---|---|---|---|---|---|---|---|---|---|---|
| FIG. 2a n | 344 | 688 | 1031 | 1375 | 1719 | 3438 | 5156 | 7875 | 8594 | 10,313 | 12,032 | 13,750 | 15,469 |
| FIG. 2b-e n | 86 | 172 | 258 | 344 | 430 | 859 | 1289 | 1719 | 2145 | 2578 | 3008 | 3438 | 3867 |

Discussion

In this section, results provided above are discussed in some depth. As each graph in FIGS. 5A-5J provides results for a different fault type and model, these results are broken down separately and each fault type is scrutinized individually.

All Faults Vs. No Faults

In FIG. 5A, it is shown that all algorithms including the MLR, MLRf, and "tiny" supervised learning algorithm behaved well and provided similar results, even with only 2% of total fault data labeled. As illustrated in Table 2, 344 datapoints out of 21,485 total datapoints were labeled at this lowest c value. It should be noted that treating unlabeled samples as negatives, as illustrated by the naïve PU algorithm, is ineffective unless nearly all faulty points (17,188 total) are labeled. In the bottom graph, it is clear that both the MLR and MLRf algorithms slightly and consistently outperform the oracle and the "tiny" supervised learning algorithms when at least 10% of the positive samples are labeled. It is believed that this may be due in part to the non-linear classification capabilities of both algorithms. This is discussed further in the next bullet point.

Shaded Vs. All Others

FIGS. 5C and 5D demonstrate a situation where the nonlinear nature of the MLRf methodology provides a clear advantage. The poor results of the supervised linear oracle model (with an F-Score of approximately 0.64) indicate that the faulty and non-faulty data for this problem are non-separable in the given feature space. The oracle model is underfitting the data. The improvement gained by the MLRf methodology with its much higher feature dimensionality confirms this. If the decision boundary is substantially algorithm on this problem at that c value, the jump at c=0.7 may be a random outlier. Additional simulations would need to be performed to test this hypothesis.

Degraded Vs. All Others

The degraded fault detection problem illustrated in FIGS. 5G and 5H is the "simplest" of all problems to solve in FIGS. 5A-5J. The oracle was able to achieve perfect classification (F-score=1) in the given feature space for this problem. The MLR, MLRf, and "tiny" supervised algorithm also performed at or near this level for all but the very smallest of c values. Notice that the lower graph had to be substantially scaled to see any variability between algorithms at all. Despite the obvious separability of this problem, neither the naïve PU algorithm nor the unsupervised k-means algorithm were useful.

Short Circuit Vs. All Others

FIGS. 5I and 5J illustrate the most interesting and enigmatic result. The oracle algorithm and related "tiny" supervised algorithm are unable to classify short circuit faults in the given feature space. The MLR and MLRf algorithms, while performing poorly with an F-score between 0.4 and 0.6, are nevertheless substantially more effective. Unlike the Shaded problem shown in FIG. 2b, higher feature dimensionality alone is not sufficient to explain this discrepancy as the lower dimensional MLR algorithm performed better than the higher dimensional MLRf algorithm. One thought is that the MLRf algorithm with p=3 and k=3 expanded features may be overfitting the problem while the slight increase in dimensionality provided by the MLR algorithm may be preferable, though this conclusion is not particularly satisfying. Other authors suggest that there are theoretical situations where PU learning can surpass supervised classification. It would be interesting to investigate if this is such a case. Either way, further research is warranted.

In addition to the increased dimensionality and non-linear models described above, one other possible improvement due to PU learning is possible. With noisy data, it may be that because of the reduction in labeled data in the positive class, outliers are likely to be excluded, simplifying the model, and improving overall performance. This does not seem likely to have played a large role in the given datasets however as the MLR and MLRf algorithm performance does not trend towards the oracle with higher values of c. Instead, it is believed that the non-linear aspects of the MLR and MLRf algorithms are more likely to explain this discrepancy as described in the bullets above. It is likely that this non-linear boundary can capture nuances that a fully linear boundary such as used in the simple supervised oracle algorithm used in this disclosure is unable to capture. feature engineering of the oracle algorithm or selection of a more advanced algorithm would likely improve this.

Due to the encouraging results, it is worth investigating these and other PU learning algorithms on additional solar fault datasets. The improvements in classification, with few labeled data samples, especially in the case of hazardous faults such as short circuits, bring significant value in terms of improved detection.

PU learning has the advantage over standard supervised and semi-supervised learning in that it does not require any labeled data from the "good" or STC class. This allows seemingly faultless data to avoid additional expensive scrutiny to confirm faultless status. Mistaking a low-level fault for STC or treating unlabeled data as negative can confuse a learning algorithm and create a poor learning model, as shown by the poor results of the naïve PU algorithm in FIGS. 5A-5J at lower values of c. At the same time, PU learning algorithms such as MLR and MLRf are extremely effective, essentially matching the quality of a fully supervised model at all but the very lowest possible percentage of labels. With a small amount of labeled fault data, PU learning can accurately label the large amount of unknown data as well as creating an effective model for future data. Comparisons with a "tiny" supervised learning algorithm in FIGS. 5A-5F, 5I and 5J with the same number of labeled samples split between the positive and negative classes illustrate the benefit of PU learning and the advantage found in using the unlabeled data.

Simulations were performed for PU labeled fault detection and classification for a variety of different c values representing the percentage of known labels for the class of interest. Both the original MLR and the new MLRf algorithm provide extremely robust results, equaling or surpassing a fully supervised oracle algorithm when less than 10% of labels from the class of interest were available.

---

Algorithm A1 Modified Logistic Regression using Stochastic Gradient Ascent

Input: Data $X^{m \times n}$, IsItLabeled $s^{m \times 1}$
Output: Labels $y^{m \times 1}$
//Initialization
$X \leftarrow$ normalize(X);
$X \leftarrow$ concat([1]$^{m \times 1}$, X//Add a column of ones to X
$\omega \leftarrow [1]^{1 \times n}$;
$b \leftarrow 1$;
$\lambda \leftarrow 0.01$//Learning rate set to some constant or schedule
//Learn Model

---

-continued

Algorithm A1 Modified Logistic Regression using Stochastic Gradient Ascent

While Maximum Epochs not reached do
  For x in X do $$\frac{\partial L}{\partial \omega} \leftarrow \left( \frac{s-1}{b^2 + e^{-\omega \cdot x}} + \frac{1}{1 + b^2 + e^{-\omega \cdot x}} \right) x \, e^{-\omega \cdot x}$$

$$\frac{\partial L}{\partial b} \leftarrow \left( \frac{1-s}{b^2 + e^{-\omega \cdot x}} + \frac{1}{1 + b^2 + e^{-\omega \cdot x}} \right) 2b$$

$$\omega \leftarrow \omega + \lambda \cdot \frac{\partial L}{\partial \omega}$$

$$b \leftarrow b + \lambda \cdot \frac{\partial L}{\partial b}$$

end
end
//Apply Model $$\hat{s} \leftarrow \frac{1}{1 + b^2 + e^{-\omega \cdot x}} \qquad //p(s = 1|x)$$

$$\hat{c} \leftarrow \frac{1}{1 + b^2} \qquad //p(s = 1|y = 1)$$

$\hat{y} \leftarrow \hat{s}/\hat{c}$      //p(y = 1|x) - Can be thresholded at some
              //cutoff value to make a binary classifier

---

Computer-Implemented System

Figure 6:
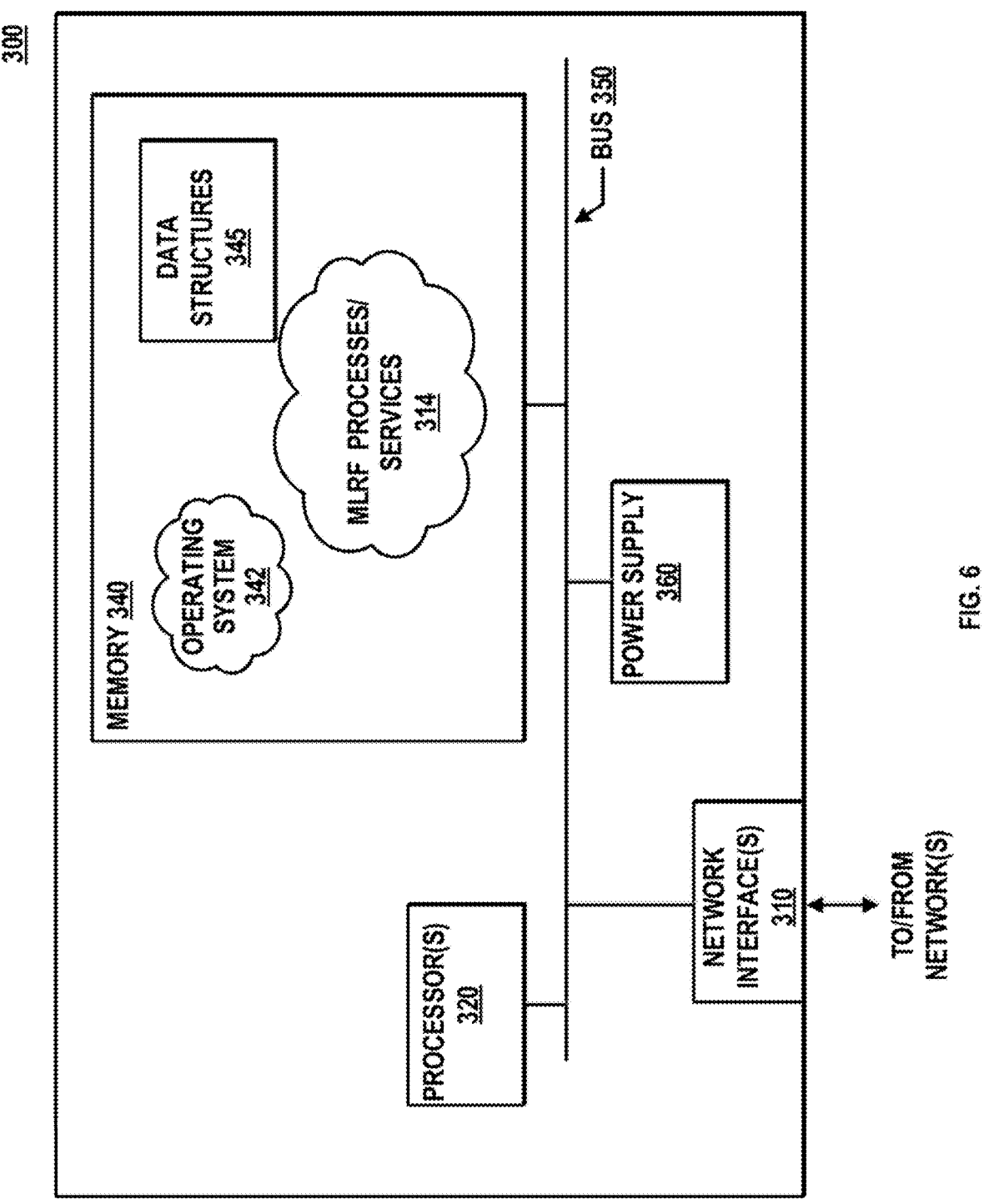
FIG. 6 is a simplified diagram showing an exemplary computing system for implementation of the system of FIG. 1.

FIG. 6 is a schematic block diagram of an example device 300 that may be used with one or more embodiments described herein, e.g., as a component of system 100.

Device 300 comprises one or more network interfaces 310 (e.g., wired, wireless, PLC, etc.), at least one processor 320, and a memory 340 interconnected by a system bus 350, as well as a power supply 360 (e.g., battery, plug-in, etc.).

Network interface(s) 310 include the mechanical, electrical, and signaling circuitry for communicating data over the communication links coupled to a communication network. Network interfaces 310 are configured to transmit and/or receive data using a variety of different communication protocols. As illustrated, the box representing network interfaces 310 is shown for simplicity, and it is appreciated that such interfaces may represent different types of network connections such as wireless and wired (physical) connections. Network interfaces 310 are shown separately from power supply 360, however it is appreciated that the interfaces that support PLC protocols may communicate through power supply 360 and/or may be an integral component coupled to power supply 360.

Memory 340 includes a plurality of storage locations that are addressable by processor 320 and network interfaces 310 for storing software programs and data structures associated with the embodiments described herein. In some embodiments, device 300 may have limited memory or no memory (e.g., no memory for storage other than for programs/processes operating on the device and associated caches).

Processor 320 comprises hardware elements or logic adapted to execute the software programs (e.g., instructions) and manipulate data structures 345. An operating system 342, portions of which are typically resident in memory 340 and executed by the processor, functionally organizes device 300 by, inter alia, invoking operations in support of software processes and/or services executing on the device. These software processes and/or services may include MLRf processes/services 314 described herein. Note that while MLRf processes/services 314 is illustrated in centralized memory 340, alternative embodiments provide for the process to be operated within the network interfaces 310, such as a component of a MAC layer, and/or as part of a distributed computing network environment.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules or engines configured to operate in accordance with the techniques herein (e.g., according to the functionality of a similar process). In this context, the term module and engine may be interchangeable. In general, the term module or engine refers to model or an organization of interrelated software components/functions. Further, while the MLRf processes/services 314 is shown as a standalone process, those skilled in the art will appreciate that this process may be executed as a routine or module within other processes.

It should be understood from the foregoing that, while particular embodiments have been illustrated and described, various modifications can be made thereto without departing from the spirit and scope of the invention as will be apparent to those skilled in the art. Such changes and modifications are within the scope and teachings of this invention as defined in the claims appended hereto.

What is claimed is:

1. A system, comprising:
a processor in communication with a memory and one or more sensors in operative communication with a photovoltaic array wherein the one or more sensors are operable to capture operational data for the photovoltaic array and communicate the operational data to the processor, the memory including instructions, which, when executed, cause the processor to:
(a) access a training dataset comprising a plurality of data samples, each data sample having a plurality of features descriptive of sensor-derived operational data of a photovoltaic panel of the photovoltaic array, wherein a first subset of the plurality of data samples is labeled as positive and a second subset is unlabeled;
(b) access a plurality of weights of a non-traditional classification model, the non-traditional classification model being trained to estimate, for a data sample and using the training dataset, a labeling probability that the data sample is labeled as positive, wherein the non-traditional classification model is trained using the first subset labeled as positive and the second subset unlabeled to estimate the labeling probability, and determine an estimated labeling frequency value corresponding to an upper bound on the labeling probability that a data sample corresponding to a positive class is labeled;
(c) generate an augmented feature set based on the training dataset by application of one or more non-linear transformations to a plurality of most influential features of the plurality of features based on a magnitude of each weight of the plurality of weights of the non-traditional classification model, wherein the plurality of most influential features comprises a top k highest-weighted features selected based on the magnitude of the plurality of weights, and wherein the one or more non-linear transformations comprise adding p-level polynomial combinations of the top k highest-weighted features to obtain an expanded feature space; and
(d) apply the non-traditional classification model to the training dataset as represented in the expanded feature space to estimate, for each data sample of the training dataset, the labeling probability that the data sample is labeled as positive;
wherein the processor is operable to: (i) determine, for a new data sample of operational data corresponding to the photovoltaic panel as obtained by the one or more sensors and sing the non-traditional classification model, a labeling probability that the new data sample is labeled as positive, and (ij) classify the photovoltaic panel into a first class or a second class using a fault classification model configured to classify based on the labeling probability and the estimated labeling frequency value corresponding to an upper bound on the labeling probability that a data sample corresponding to a positive class is labeled, wherein the first class is indicative of a fault and wherein the second class is indicative of no fault.

2. The system of claim 1, wherein the memory further includes instructions which, when executed, cause the processor to:
receive, by the processor, the operational data from the one or more sensors, wherein the operational data includes photovoltaic data including the plurality of features for each photovoltaic panel of the photovoltaic array.

3. The system of claim 1, wherein the non-traditional classification model is a Modified Logistic Regression classifier.

4. The system of claim 3, wherein the Modified Logistic Regression classifier defines a weighted combination of the plurality of features, wherein each feature of the plurality of features is associated with a respective weight of the plurality of weights of the non-traditional classification model.

5. The system of claim 1, wherein the processor as configured increases a dimensionality of each feature by adding p-level polynomial combinations of the top k highest-weighted features to the training dataset.

6. The system of claim 1, wherein the processor as configured applies the non-traditional classification model to the training dataset as represented in the expanded feature space thereby introducing a non-linear decision boundary into a feature space descriptive of the plurality of features of the training dataset.

7. The system of claim 1, wherein the memory further includes instructions which, when executed, cause the processor to:
receive an amount k of highest-weighted features to be selected.

8. The system of claim 1, wherein the processor as configured minimizes one or more features of the expanded feature space that do not substantially contribute to classification using a dimensionality reduction algorithm.

9. The system of claim 8, wherein the dimensionality reduction algorithm is a Principal Component Analysis algorithm.

10. The system of claim 1, wherein the processor as configured minimizes one or more features of the expanded feature space that do not substantially contribute to classification using a regularization algorithm.

11. The system of claim 1, further comprising: receiving a value indicative of a level of polynomial enhancements (p).

12. A system, comprising:

a photovoltaic array including a plurality of photovoltaic panels and one or more sensors in operative communication with the plurality of photovoltaic panels;

a processor in communication with a memory and the photovoltaic array, wherein the one or more sensors are operable to capture operational data for the photovoltaic array and communicate the operational data to a processor, the memory including instructions, which, when executed, cause the processor to:

access a plurality of weights of anon-traditional classification model, the non-traditional classification model trained to estimate, for a data sample and using a training dataset, a labeling probability that the data sample is labeled as positive, wherein the non-traditional classification model is trained using a first subset labeled as positive and a second subset unlabeled to estimate the labeling probability, and determine an estimated labeling frequency value corresponding to an upper bound on the labeling probability that a data sample corresponding to a positive class is labeled;

generate, for a new data sample of operational data corresponding to a photovoltaic panel as obtained by the one or more sensors, an augmented feature set by application of one or more non-linear transformations to a plurality of most influential features based on a magnitude of each weight of a plurality of weights of the non-traditional classification model, wherein the plurality of most influential features comprises atop k highest-weighted features selected based on the magnitude of the plurality of weights, and wherein the one or more non-linear transformations comprise adding p-level polynomial combinations of the top k highest-weighted features to obtain an expanded feature space;

apply the non-traditional classification model to the new data sample as represented in the expanded feature space to determine a labeling probability that the new data sample is labeled as positive; and classify the photovoltaic panel into a first class or a second class using a fault classification model configured to classify based on the labeling probability and the estimated labeling frequency value of the non-traditional classification model corresponding to an upper bound on the labeling probability that a data sample corresponding to a positive class is labeled, wherein the first class is indicative of a fault and wherein the second class is indicative of no fault.

13. The system of claim 12, wherein the non-traditional classification model is a Modified Logistic Regression classifier.

14. The system of claim 13, wherein the Modified Logistic Regression classifier defines a weighted combination of a plurality of features, wherein each feature is associated with a respective weight of the plurality of weights of the non-traditional classification model.

15. The system of claim 12, wherein the processor as configured increases a dimensionality of each feature by adding p-level polynomial combinations of the top k highest-weighted features to the new data sample.

16. The system of claim 12, wherein the processor as configured minimizes one or more features of the expanded feature space that do not substantially contribute to classification using a dimensionality reduction algorithm.

17. A method, comprising:

(a) accessing, at a processor in communication with a memory and one or more sensors in operative communication with a photovoltaic array wherein the one or more sensors are operable to capture operational data for the photovoltaic array and communicate the operational data to the processor, a training dataset comprising a plurality of data samples, each data sample having a plurality of features descriptive of sensor-derived operational data of a photovoltaic panel of the photovoltaic array, wherein a first subset of the plurality of data samples is labeled as positive and a second subset is unlabeled;

(b) accessing a plurality of weights of a non-traditional classification model, the non-traditional classification model being trained to estimate, for a data sample and using the training dataset, a labeling probability that the data sample is labeled as positive, wherein the non-traditional classification model is trained using the first subset labeled as positive and the second subset unlabeled to estimate the labeling probability, and determining an estimated labeling frequency value corresponding to an upper bound on the labeling probability that a data sample corresponding to a positive class is labeled;

(c) generating an augmented feature set based on the training dataset by application of one or more non-linear transformations to a plurality of most influential features of the plurality of features based on a magnitude of each weight of the plurality of weights of the non-traditional classification model, wherein the plurality of most influential features comprises atop k highest-weighted features selected based on the magnitude of the plurality of weights, and wherein the one or more non-linear transformations comprise adding p-level polynomial combinations of the top k highest-weighted features to obtain an expanded feature space;

(d) applying the non-traditional classification model to the training dataset as represented in the expanded feature space to estimate, for each data sample of the training dataset, the labeling probability that the data sample is labeled as positive;

(e) determining, for a new data sample of operational data corresponding to the photovoltaic panel as obtained by the one or more sensors and using the non-traditional classification model, a labeling probability that the new data sample is labeled as positive; and (f) classifying the photovoltaic panel into a first class or a second class using a fault classification model configured to classify based on the labeling probability and the estimated labeling frequency value corresponding to an upper bound on the labeling probability that a data sample corresponding to a positive class is labeled, wherein the first class is indicative of a fault and wherein the second class is indicative of no fault.

18. The method of claim 17, wherein the non-traditional classification model is a Modified Logistic Regression classifier, wherein the Modified Logistic Regression classifier defines a weighted combination of the plurality of features, wherein each feature is associated with a respective weight of the plurality of weights.

19. The method of claim 17, wherein the processor as configured increases a dimensionality of each feature by adding p-level polynomial combinations of the top k highest-weighted features to the training dataset.

20. The method of claim 17, wherein the processor as configured minimizes one or more features of the expanded feature space that do not substantially contribute to classi-fication using a dimensionality reduction algorithm.

21. The method of claim 17, wherein the processor as configured minimizes one or more features of the expanded feature space that do not substantially contribute to classi-fication using a regularization algorithm.

* * * * *